United States Patent
Huang et al.

(10) Patent No.: US 10,449,559 B2
(45) Date of Patent: Oct. 22, 2019

(54) COMBINED SHOWER HEAD WITH COOL WATER DISCHARGING FUNCTION

(71) Applicant: XIAMEN SOLEX HIGH-TECH INDUSTRIES CO., LTD., Xiamen, Fujian (CN)

(72) Inventors: Xi Huang, Fujian (CN); Donghai Chen, Fujian (CN); Mingfu Zhang, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 70 days.

(21) Appl. No.: 15/903,334

(22) Filed: Feb. 23, 2018

(65) Prior Publication Data
US 2018/0280995 A1    Oct. 4, 2018

(30) Foreign Application Priority Data
Apr. 1, 2017  (CN) .......................... 2017 1 0213403

(51) Int. Cl.
*B05B 1/18*    (2006.01)
*F16K 31/00*    (2006.01)
(Continued)

(52) U.S. Cl.
CPC ............ *B05B 1/185* (2013.01); *B05B 1/1636* (2013.01); *B05B 1/18* (2013.01); *B05B 12/10* (2013.01);
(Continued)

(58) Field of Classification Search
CPC ......... B05B 1/185; B05B 1/1636; B05B 1/18; B05B 12/10; E03C 1/023; E03C 1/0409; F16K 11/22; F16K 31/002
(Continued)

(56) References Cited

U.S. PATENT DOCUMENTS 6,896,201 B1 *   5/2005   Ouyoung .................. B05B 1/18
                                                               239/240
2007/0194141 A1 *  8/2007   Brown .................. F16K 31/002
                                                               236/93 A
(Continued)

FOREIGN PATENT DOCUMENTS

CN          106015653 A       10/2016

*Primary Examiner* — Tuan N Nguyen
(74) *Attorney, Agent, or Firm* — Rabin & Berdo, P.C.

(57) ABSTRACT

Disclosed is a combined shower head with cool water discharging function, which comprises two shower heads; the first shower head is disposed with an inlet passage, a first outlet portion and a first water diversion passage connected to the first outlet portion, the second shower head is disposed with a second outlet portion; the first shower head is further disposed with a water supply passage, a cool water discharging passage connected to the inlet passage, a temperature sensing component disposed in the cool water discharging passage and a control mechanism, the control mechanism is coupled to the inlet passage and the water supply passage to control the connection and disconnection of the inlet passage and the water supply passage. The present invention has advantages: the structure is simple, compact and low cost; the user can assemble the shower head fast and conveniently.

24 Claims, 18 Drawing Sheets

FIG. 4

(51) Int. Cl.
*F16K 11/22* (2006.01)
*E03C 1/02* (2006.01)
*E03C 1/04* (2006.01)
*B05B 1/16* (2006.01)
*B05B 12/10* (2006.01)

(52) U.S. Cl.
CPC ............ *E03C 1/023* (2013.01); *E03C 1/0409* (2013.01); *F16K 11/22* (2013.01); *F16K 31/002* (2013.01)

(58) Field of Classification Search
USPC ..................................................... 4/601, 570
See application file for complete search history.

(56) References Cited

U.S. PATENT DOCUMENTS

| | | | | |
|---|---|---|---|---|
| 2014/0311592 | A1* | 10/2014 | Cutler | F16K 31/002 137/468 |
| 2017/0120264 | A1* | 5/2017 | Lin | B05B 1/1636 |
| 2019/0093324 | A1* | 3/2019 | Backus | E03C 1/0409 |

* cited by examiner

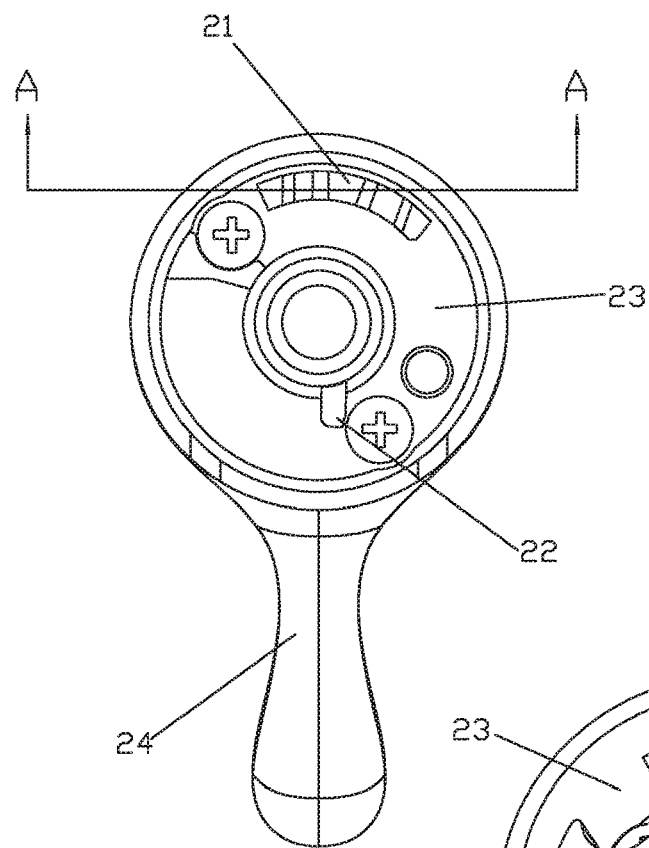
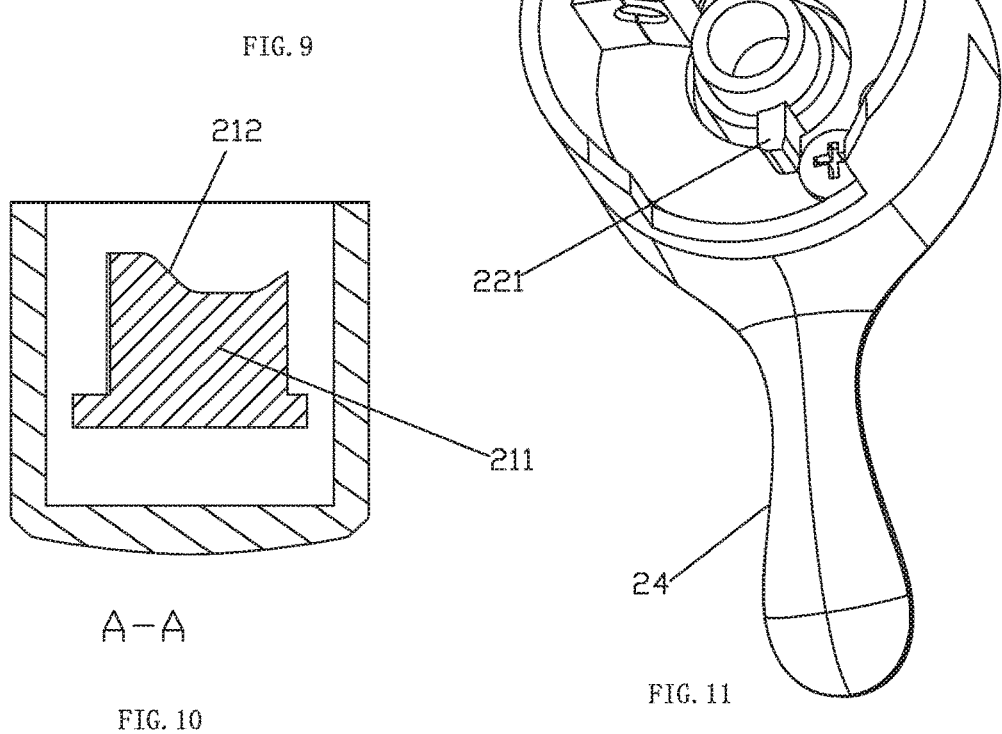
FIG. 9
FIG. 10
FIG. 11

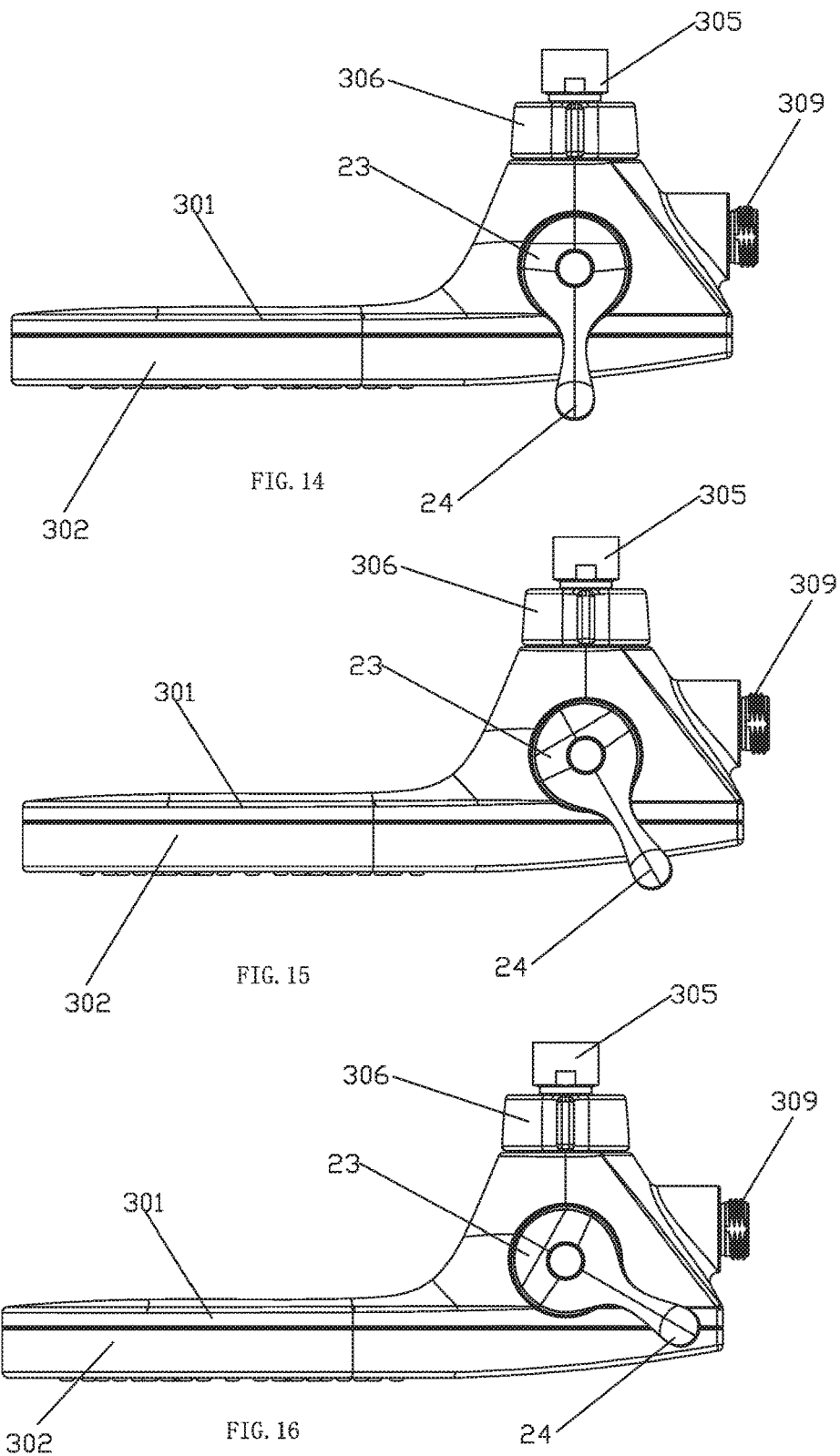

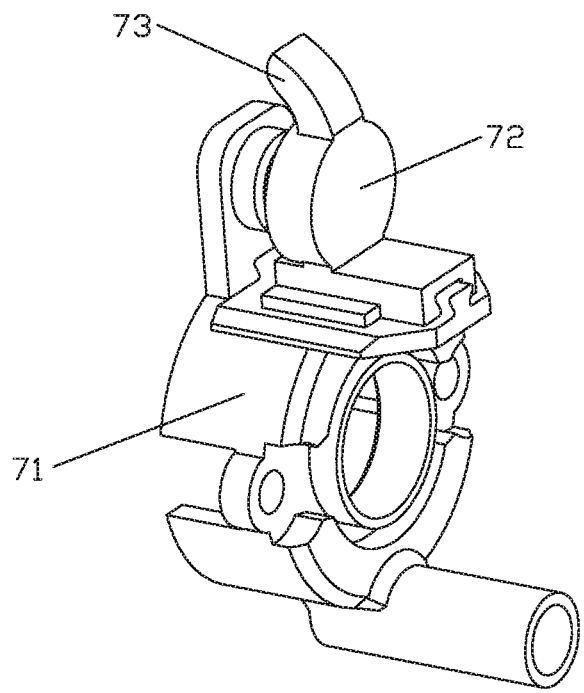
FIG. 23
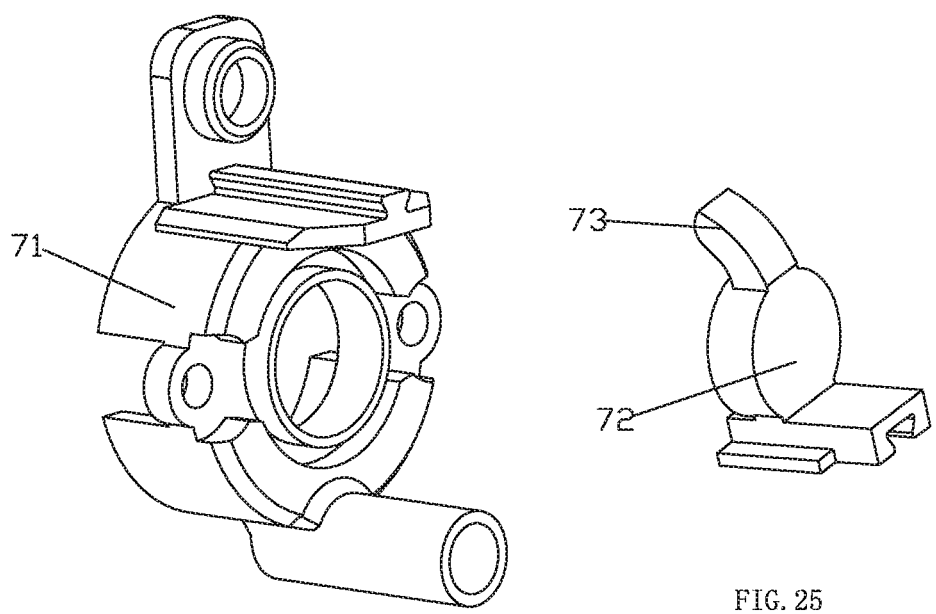
FIG. 24
FIG. 25

COMBINED SHOWER HEAD WITH COOL WATER DISCHARGING FUNCTION

FIELD OF THE INVENTION

The present invention relates to a combined shower head with cool water discharging function.

BACKGROUND OF THE INVENTION

Existing combined shower head with cool water discharging function, for example disclosed in the Chinese patent database with publishing number CN106015653B, comprises a switch valve, a first shower head and a second shower head. The switch valve is disposed with an inlet passage, a first water diversion passage, a second water diversion passage, a cool water discharging passage, a switch mechanism and a temperature sensing component in the cool water discharging passage. the switch mechanism is coupled to the inlet passage, the first and second water diversion passage and the cool water discharging passage to switch the first water diversion passage, the second water diversion passage, the cool water discharging passage to connect to the inlet passage. the first water diversion passage is connected to the first shower head, the second water diversion passage is connected to the second shower head, the cool water discharging passage is connected to the second shower head. The combined shower head has disadvantages: 1. if there are two shower heads, one inlet passage is coupled to three water diversion passages (the first water diversion passage, the second water diversion passage, the cool water discharging passage), the structure is complex; 2. The first shower head is assembled to the switch valve, the second shower head is connected to the second water diversion passage, the user needs to assemble the switch valve to the water supply pipe and the first shower head to the switch valve and to connect the second shower head and the switch valve, the assembly is inconvenient and complicated.

SUMMARY OF THE INVENTION

The present invention is provided with a combined shower head with cool water discharging function, which overcomes the disadvantages of the exiting combined shower head.

The technical solution of the present invention is that:

A combined shower head with cool water discharging function, comprising a first shower head and a second shower head; the first shower head is disposed with an inlet passage, a first outlet portion and a first water diversion passage connected to the first outlet portion, the second shower head is disposed with a second outlet portion; wherein the first shower head is further disposed with a water supply passage, a cool water discharging passage connected to the inlet passage, a temperature sensing component disposed in the cool water discharging passage and a control mechanism, the control mechanism is coupled to the inlet passage and the water supply passage to control the connection and disconnection of the inlet passage and the water supply passage;

the first shower head is further disposed with a second water diversion passage and a switch mechanism; the switch mechanism is coupled to the water supply passage, the first water diversion passage and the second water diversion passage to fluid communicate the water supply passage with one of the first and second water diversion passage; the cool water discharging passage is connected to the second water diversion passage, the second water diversion passage is connected to the second outlet portion.

In another preferred embodiment, the first shower head is further disposed with a check valve being disposed at the portion of the second water diversion passage connecting the cool water discharging passage and the switch mechanism.

In another preferred embodiment, the control mechanism is also a switch mechanism, the switch mechanism is coupled to the inlet passage, the water supply passage and the cool water discharging passage to fluid communicate the inlet passage with one of the water supply passage and the cool water discharging passage.

In another preferred embodiment, further comprising an operation portion being assembled in the first shower head and connected the control mechanism and the switch mechanism in transmission way to control the control mechanism and the switch mechanism.

In another preferred embodiment, the operation portion comprises an operation element being movably connected to the first shower head and being movable in a first track and a second track in relation to the first shower head; the operation element is disposed with a first transmission portion coupled to the control mechanism and a second transmission portion coupled to the switch mechanism; the operation element moves in the first track and the second track so as to respectively drive the control mechanism by the first transmission portion and drive the switch mechanism by the second transmission portion in transmission way.

In another preferred embodiment, the operation portion is rotatably connected to the first shower head; the first track is a swing track of the operation element swinging from an initial position to a forward position in relation to the first shower head; the second track is a swing track of the operation element swinging from an initial position to a backward position in relation to the first shower head; the forward position and the backward position are arranged at two sides of the initial position.

In another preferred embodiment, the operation portion is rotatably connected to the first shower head; the first track is a swing track of the operation element swinging from an initial position to a central position in relation to the first shower head; the second track is a swing track of the operation portion swinging from an initial position to a switch position in relation to the first shower head; the initial position, the central position and the switch position are arranged in a circumference.

In another preferred embodiment, the end face of the operation element is protruding with a protruding base, the protruding base is disposed with a contact surface arranged about the rotating axis of the operation element with a various height of arc; the first transmission portion comprises the protruding base, the contact surface of the protruding base is connected to the control mechanism in transmission way; the end face of the operation element is protruding with a driving base, the second transmission portion comprises the driving base.

In another preferred embodiment, the control mechanism comprises a slide bar slidable in relation to the first shower head and a first elastic body abutting between a first end of the slide bar and the first shower head; the contact surface abuts against the second end of the slide bar; the slide bar resets and the inlet passage is connected to the cool water discharging passage after the water supply is turned off under the action of the first elastic body.

In another preferred embodiment, the switch mechanism comprises a rotating plate rotatably connected to the first shower head, the rotating plate switches the functions by rotating in relation to the first shower; an one-way intermittent moving mechanism and a moving element movably connected to the first shower head are disposed between the rotation plate and the driving base; the driving base is connected to the moving element in transmission way to drive the moving element to move in the second track; the moving element drives the rotating plate to rotate through the one-way intermittent moving mechanism.

In another preferred embodiment, the one-way intermittent moving mechanism is a ratchet and pawl mechanism, the ratchet of the ratchet and pawl mechanism is fixed to the rotating plate coaxially; the moving element is connected to the pawl of the ratchet and pawl mechanism in transmission way.

In another preferred embodiment, the moving element is a swing bar connected to the first shower head in swing way.

In another preferred embodiment, a second elastic body is disposed between the operation element and the first shower head to drive the operation element to reset to the initial position.

In another preferred embodiment, the operation element is slidable in relation to the first shower head and is rotatably connected to the first shower head about the sliding direction, the sliding track of the operation element along the first shower head is the first track, the rotating track of the operation element about the first shower head is the second track.

In another preferred embodiment, the control mechanism comprises a sliding bar slidable in relation to the first shower head and a first elastic body abutting between a first end of the sliding bar and the first shower head; the operation element abuts against a second end of the sliding bar to control the sliding bar to slide;

the switch mechanism comprises a rotating base rotatably connected to the first shower head, the rotating plate rotates in relation to the first shower head to switch;

the operation element is connected to the rotating base in transmission way to control the rotating base to rotate.

In another preferred embodiment, the operation element and the rotating plate rotate coaxially and synchronously and are movably connected in the axial direction.

In another preferred embodiment, the operation element is rotatably connected to the first shower head, the rotating of the operation element along the first shower head is the first rack; the reversely rotating of the operation element along the first shower head is the second track; a clutch is disposed between the operation element, the control mechanism and the switch mechanism.

In another preferred embodiment, the operation portion comprises a first operation element movably connected to the first shower head and a second operation element movably connected to the first shower head; the first operation element is connected to the control mechanism in transmission way, the second operation element is connected to the switch mechanism in transmission way.

Compared to the existing known technology, the technical solution has the advantages:

1. the inlet passage is divided to the water supply passage and the cool water discharging passage, the water supply passage then is divided to the first water diversion passage and the second water diversion passage; a water passage can be divided to two water passages when configuring two shower head. The structure is simple, compact and low cost. The second shower head and the cool water discharging passage share the outlet of the second shower head, they are individual, the structure is compact. These structures are directly disposed to the first shower head, which can be directly assembled to the water supply pipe, the user can assemble the shower head fast and conveniently.

2. the operation element moves in the first track and the second track to individually drive the control mechanism by the first transmission portion and drive the switch mechanism by the second transmission portion; one operation element can control the control mechanism and the switch mechanism at the same time; the structure is compact and low cost; the sealing performance is improved, the operation is convenient and fast.

3. The first track is a swing track of the operation element swinging from an initial position to a forward position in relation to the first shower head; the second track is a swing track of the operation portion swinging from an initial position to a backward position in relation to the first shower head; the operation is convenient and misoperation is avoided; the structure is compact.

4. The first track is a swing track of the operation element swinging from an initial position to a central position in relation to the first shower head; the second track is a swing track of the operation portion swinging from an initial position to a switch position in relation to the first shower head; the initial position, the central position and the switch position are arranged in a circumference. The operation is convenient and misoperation is avoided; the structure is compact.

5. The protruding base is disposed with a contact surface arranged about the rotating axis of the operation element with a various height of arc; the first transmission portion comprises the protruding base, the contact surface of the protruding base is connected to the control mechanism in transmission way; the end face of the operation element is protruding with a driving base, the second transmission portion comprises the driving base. The control mechanism is controlled by the various height of the contact surface, the driving base swings to drive the switch mechanism, the arrangement is reasonable, the structure is compact.

6. The control mechanism comprises the sliding bar, the contact surface of the operation element abuts against the second end of the sliding bar, the switch mechanism comprises the rotating plate, an one-way intermittent moving mechanism and a moving element are disposed between the rotating plate and the driving base; the driving base is connected to the moving element in transmission way to drive the moving element to move in the second track; the moving element drives the rotating plate to rotate by the one-way intermittent moving mechanism; the mechanism transmit less, the hand feeling of switch is good, the service life is long.

7. The operation element sliding along the first shower head is the first track, the operation element rotating about the first shower head is the second track; the operation element abuts against the second end of the sliding bar to control the slide bar to slide; the operation element is connected to the rotating base in transmission way to control the rotating base to rotate; the operation is convenient, the structure is simple and compact.

BRIEF DESCRIPTION OF THE DRAWINGS

The present invention will be further described with the drawings and embodiments.

FIG. 9 illustrates a front view of the operation element of the first embodiment.

FIG. 10 illustrates a sectional diagram of A-A of FIG. 9.

FIG. 11 illustrates a schematic diagram of the operation element of the first embodiment.

FIG. 14 illustrates a front view of the first shower head of the second embodiment when the operation element is in the initial position.

FIG. 15 illustrates a front view of the first shower head of the second embodiment when the operation element is in the central position.

FIG. 16 illustrates a front view of the first shower head of the second embodiment when the operation element is in the switch position.

FIG. 23 illustrates a schematic diagram of the pressure cover and the sliding block of the combined shower head of the third embodiment.

FIG. 24 illustrates a schematic diagram of the pressure cover of the combined shower head of the third embodiment.

FIG. 25 illustrates a schematic diagram of the sliding block of the combined shower head of the third embodiment.

DETAILED DESCRIPTION OF THE EMBODIMENTS

The First Embodiment

Figure 1:
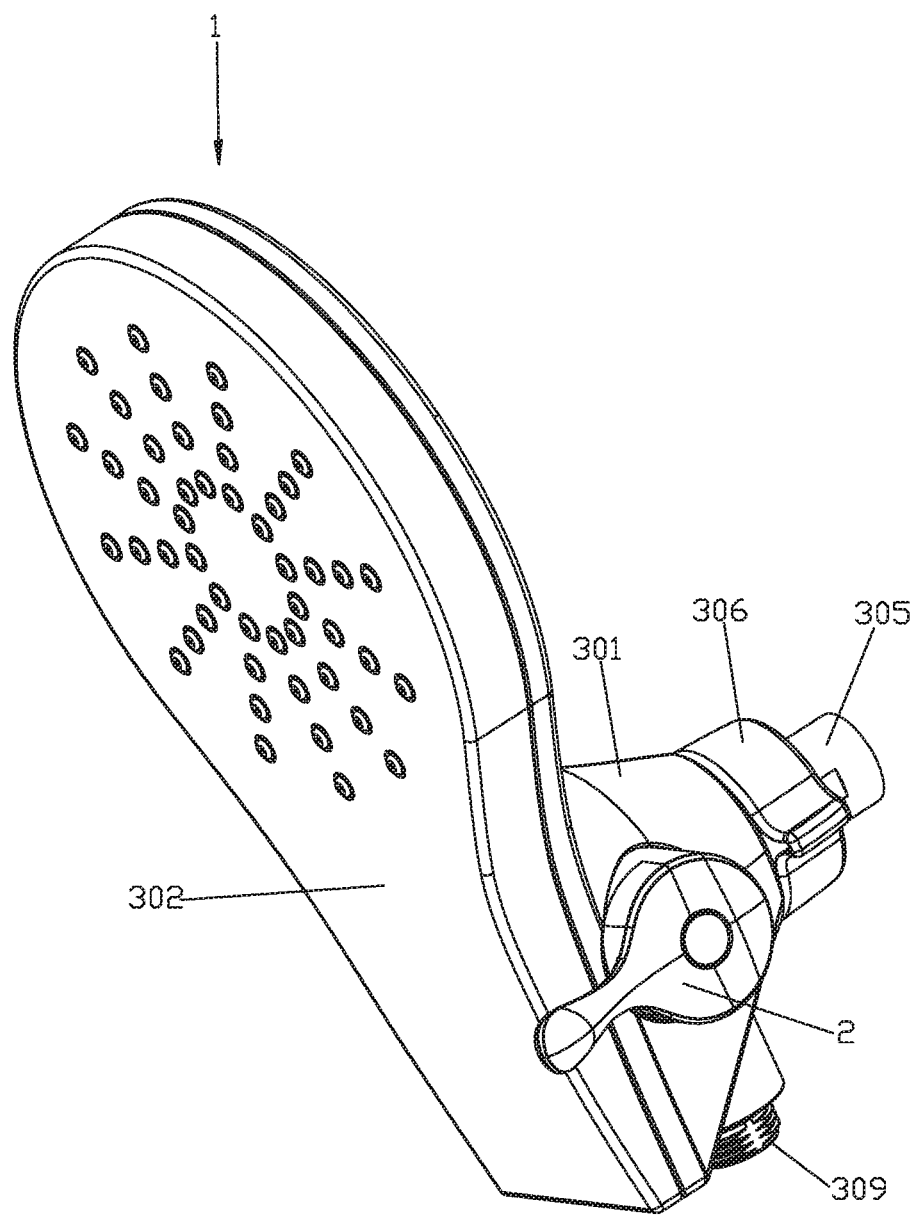
FIG. 1 illustrates a schematic diagram of a first shower head of a first embodiment.
Figure 2:
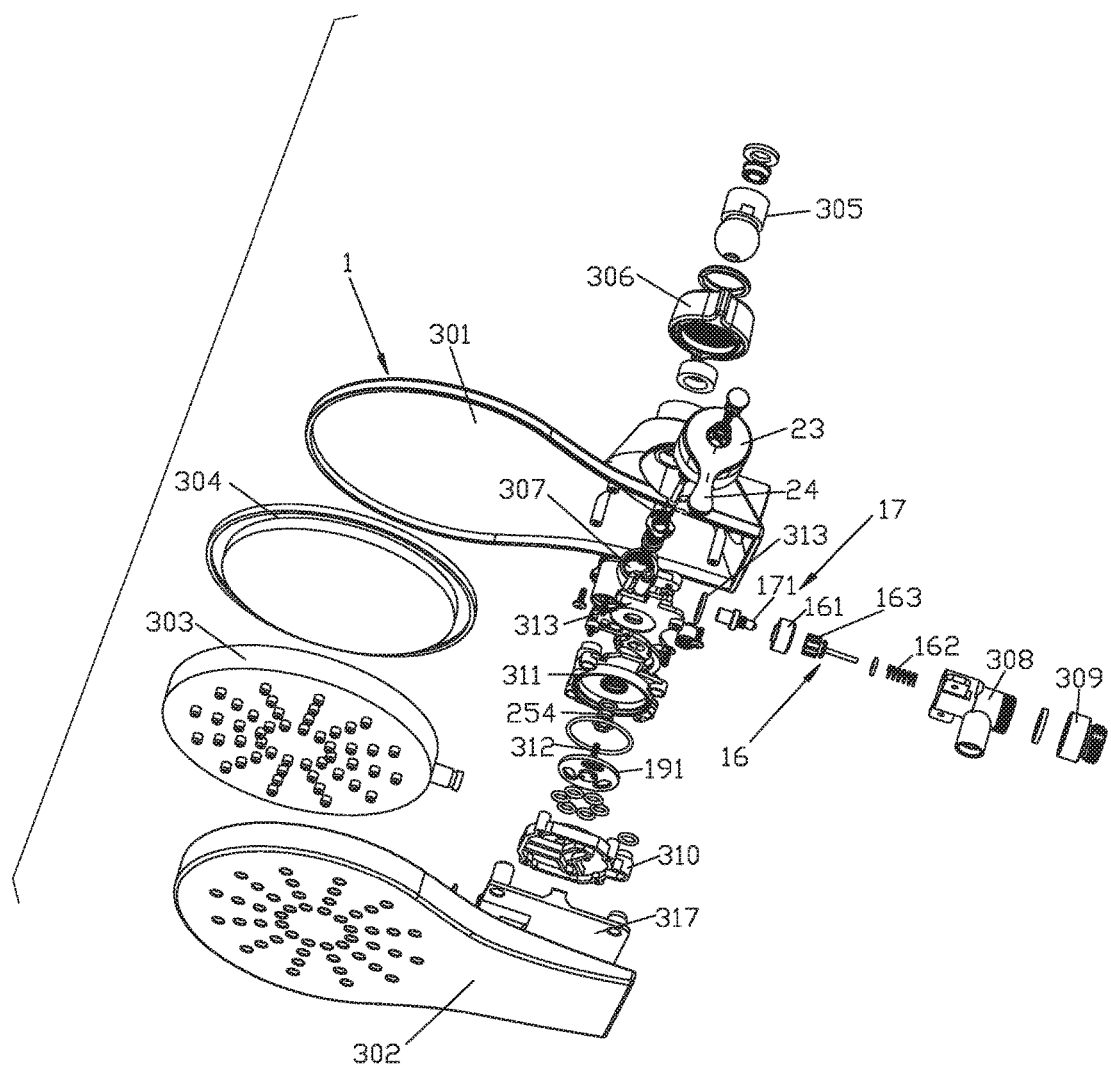
FIG. 2 illustrates an exploded diagram of the first shower head of the first embodiment.
Figure 3:
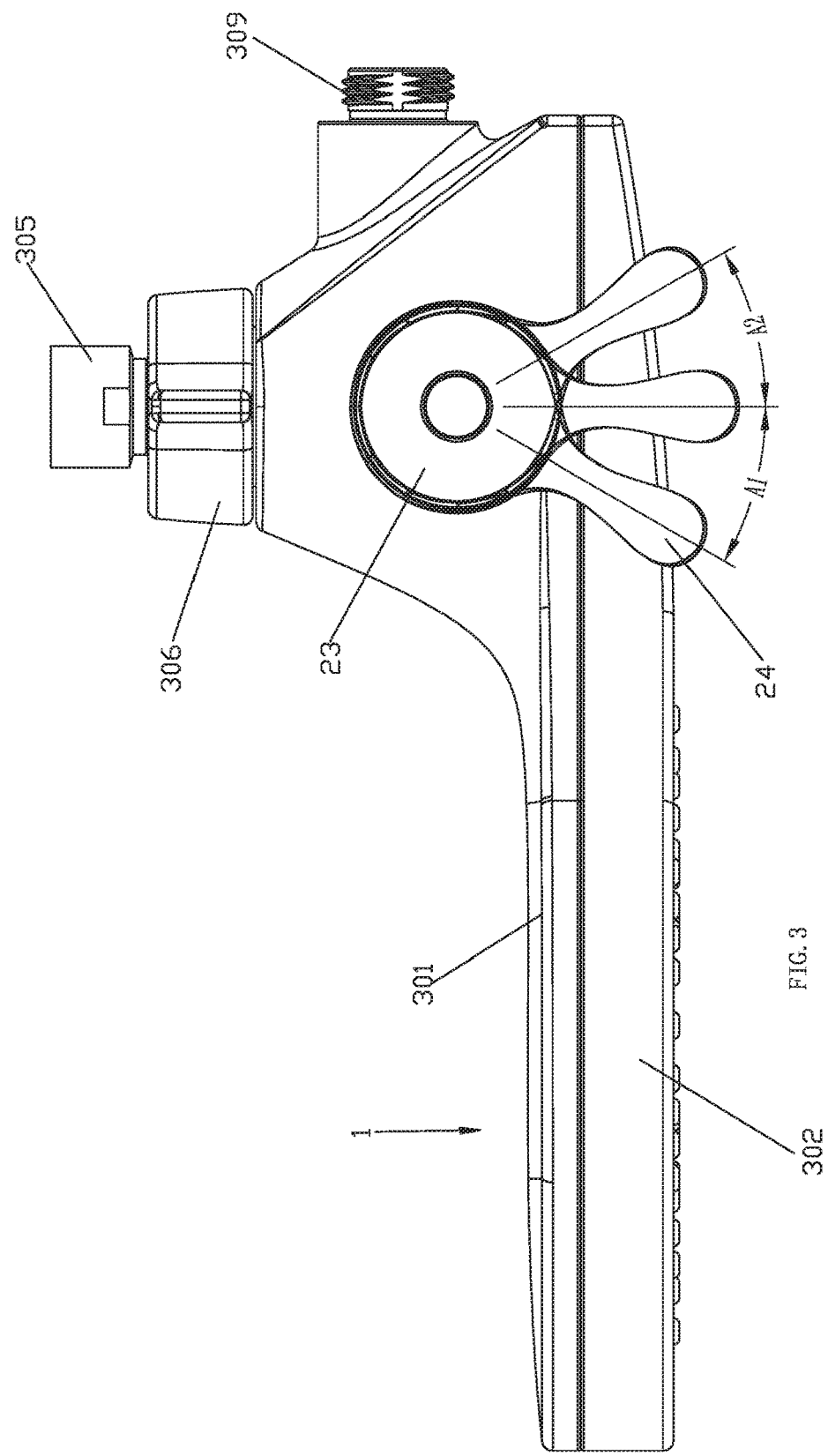
FIG. 3 illustrates a front view of the first shower head of the first embodiment when the operation element is situated in the initial position, the forward position and the backward position.
Figure 4:
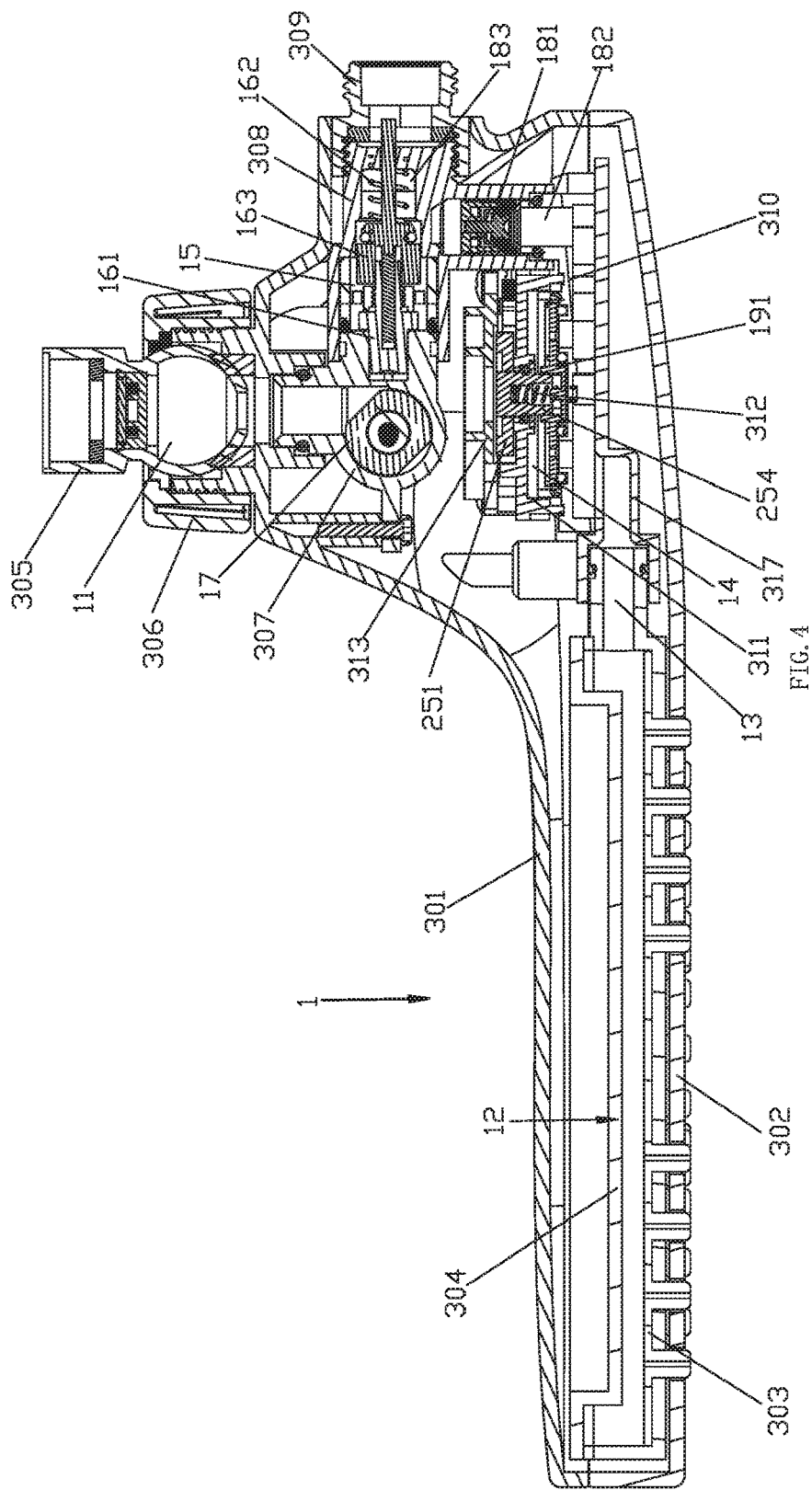
FIG. 4 illustrates a sectional diagram of the first shower head of the first embodiment, the solid line with arrow figures cool water discharging, dotted line with arrow figures water flowing out of the first shower head, dash-dotted line with arrow figures water flowing out of the second shower head.
Figure 5:
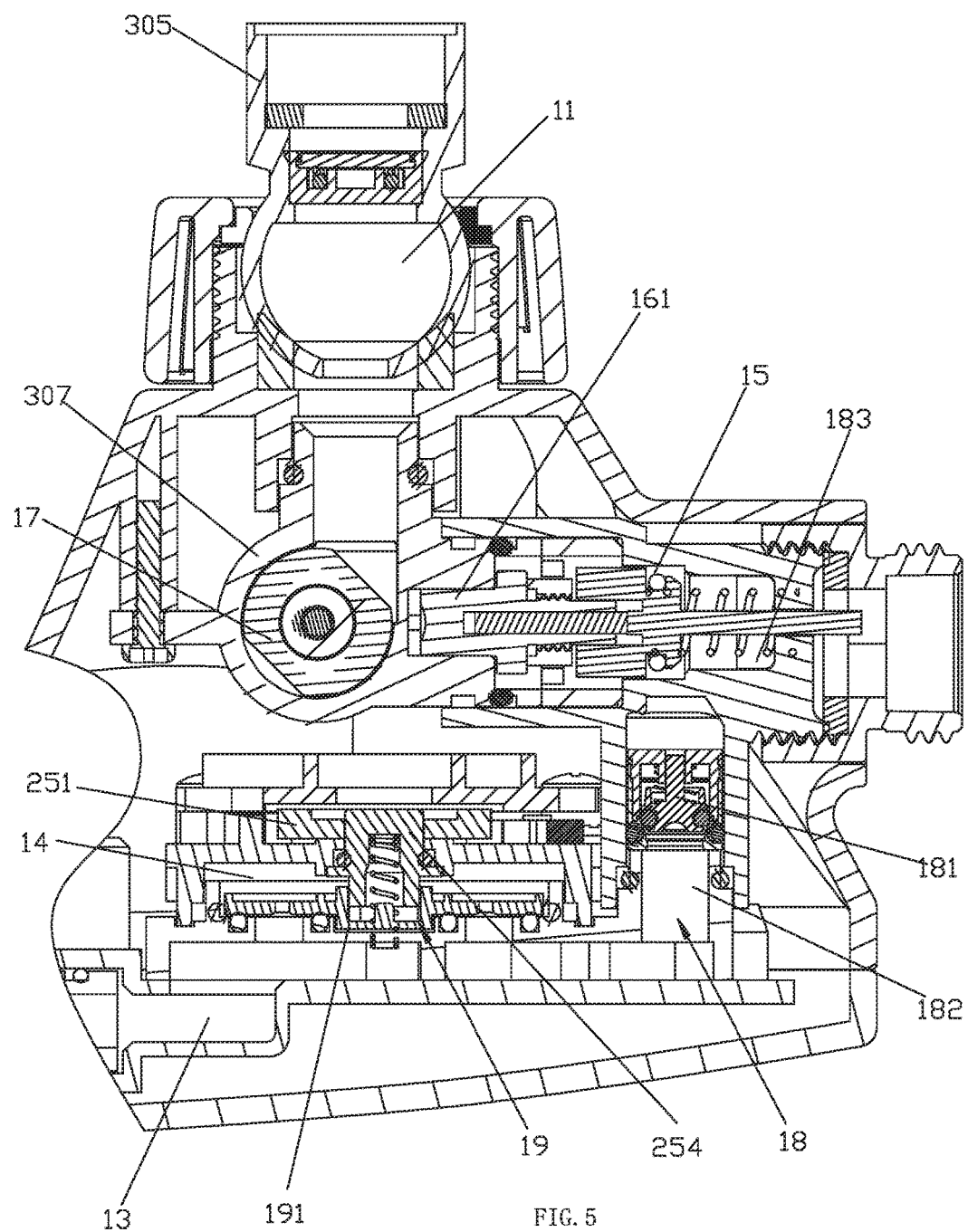
FIG. 5 illustrates a partial enlargement of FIG. 4.

Referring to FIGS. 1-11, a combined shower head with cool water discharging function comprises a first shower head 1, a second shower head and an operation portion 2; the first shower head 1 is a top shower head or a rain-like shower head assembled to the water resource for example; the second shower head is a hand shower head. This embodiment takes two shower heads for example, but it should be noted that, three shower heads or more are available, the shower heads are switched by a switch mechanism.

The first shower head 1 is disposed with an inlet passage 11, a first outlet portion 12, a first water diversion passage 13 connected to the first outlet portion 12, a water supply passage 14, a cool water discharging passage 15 available connected to the inlet passage 11, a temperature sensing component 16 in the cool water discharging passage 15 and a control mechanism 17. The second shower head is disposed with a second outlet portion.

The control mechanism 17 is coupled to the inlet passage 11 and the water supply passage 14 to control the connection and disconnection of the inlet passage 11 and the water supply passage 14; the control mechanism 17 is a switch valve or a second switch mechanism. This embodiment takes the second switch mechanism for example; the second switch mechanism is coupled to the inlet passage, the water supply passage and the cool water discharging passage to switch the water supply passage and the cool water discharging passage to connect to the inlet passage; when the cool water discharging passage is connected to the inlet passage, the water supply passage is disconnected to the inlet passage. The temperature sensing component 16 utilizes existing component; when the water flowing is in low temperature, the temperature sensing component 16 controls the cool water discharging passage to open; when the water temperature reaches to or exceeds the preset temperature, the cool water discharging passage is closed; in this embodiment, the temperature sensing component 16 comprises a temperature bulb 161 sensing the temperature for thermal expansion and contraction, a third elastic body 162 (a spring for example) and a water stop valve 163; the temperature bulb 161 expands to push the water stop valve 163 to close the cool water discharging passage and resets in cool water state; the third elastic body 162 prompts the water stop valve 163 to reset, making the cool water discharging passage to open.

The first shower head 1 comprises a second water diversion passage 18, a first switch mechanism 19 and a check valve 181; the first switch mechanism 19 is coupled to the water supply passage 14, the first water diversion passage 13 and the second water diversion passage 18 to at least switch the first and second water diversion passage to connect to the water supply passage 14; such as the first water diversion passage is connected to the water supply passage or the second water diversion passage is connected to the water supply passage, or the first and second water diversion passage are both connected to the water supply passage. The second water diversion passage 18 comprises a connecting passage 182 and an outlet passage 183; the connecting passage 182 can connect to the water supply passage 14, the first switch mechanism 19 is coupled to the connecting passage 182, a first water diversion passage 13 and a water supply passage 14; the connecting passage 182, the cool water discharging passage 15 are connected to the outlet passage 183; the external end of the outlet passage 183 is connected to the second outlet portion of the second shower head by a flexible pipe; the connecting passage 182 is disposed with a check valve for the water supply to flow from the water supply passage 14 to the outlet passage 183 and restrict the water supply from flowing from the cool water discharging passage 15 and the outlet passage 183 to the water supply passage 14 and the first water diversion passage 13.

The operation portion 2 is assembled to the first shower head 1 and is connected to the control mechanism 17 and the first switch mechanism 19 to control the control mechanism 17 to turn on and off and the first switch mechanism 19 to switch. In this embodiment, the operation portion 2 comprises an operation element, which is movably connected to the first shower head 1 to move in a first track A1 and a second track A2 in relation to the first shower head 1; the operation element 2 is disposed with a first transmission portion 21 coupled to the control mechanism 17 and a second transmission portion 22 coupled to the first switch mechanism 19; the operation element 2 moves in the first track A1 and the second track A2 to individually drive the control mechanism 17 by the first transmission portion 21 and to drive the first switch mechanism 19 by the second transmission portion 22, namely the first transmission portion 21 drives the control mechanism and the transmission of the second transmission portion 22 is cut off from the first switch mechanism 19 when operation element 2 moves in the first track A1; the second transmission portion 22 drives the first switch mechanism 19 and the transmission of the first transmission portion is cut off from the control mechanism 17 when the operation element 2 moves in the second track A2.

In detail, the operation element 2 is rotatably connected to the first shower head 1; the first track A1 is a swing track of the operation element 2 swinging from an initial position to a forward position in relation to the first shower head 1; the second track A2 is a swing track of the operation element 2 swinging from an initial position to a backward position in relation to the first shower head 1; the forward position and the backward position are arranged at two sides of the initial position. A second elastic body, a torsion spring for example, abuts between the operation element 2 and a first shower head 1 to rest the operation element 1 to the initial position. But not limited to this, as needed: 1. The operation element comprises a first operation element connected to the control mechanism in transmission way and a second operation element connected to the switch mechanism in transmission way, the moving track of the first operation element is the first track, the moving track of the second operation element is the second track; 2. the operation element is slidable in relation to the first shower head and is rotataly connected to first shower head, the operation element sliding along the first shower head is the first track, the operation element rotating about the first shower head is the second track; 3. the operation element is rotatably connected to the first shower head, the operation shower head rotating forwardly about the first shower head is the first track, the operation element rotating backwardly about the first shower head is the second track; a clutch mechanism is disposed between the operation element, the control mechanism and the switch mechanism.

The control mechanism 17 comprises a slide bar 171 slidable in relation to the first shower head 1 and a first elastic body 172, a spring for example, abutting between a first end of the slide bar 171 and the first shower head 1; the sliding bar 171 slides to control the control mechanism to, for example, control the inlet passage 11 to connect to the water supply passage 14 to be in switch state or the inlet passage 11 to connect to the cool water discharging passage 15 to be in cool water discharging state. The first switch mechanism 19 comprises a rotating plate 191 rotatably connected to the first shower head 1; the rotating plate 191 rotates in relation to the first shower head 1 to, for example, switch the first water diversion passage to connect to the water supply passage or the second diversion passage to connect to the water supply passage or the first and second water diversion passages both to connect to the water supply passage. In this embodiment, the control mechanism 17 keeps in control state under the action of the water pressure and keeps in switch state if the operation mechanism 19 is operated, of course if the water source is closed, the water pressure disappears, the control mechanism 17 resets under the action of the first elastic body, the inlet passage is connected to the cool water discharging passage, at the same time, the operation element resets to initial position under the action of the second elastic body.

The operation element 2 comprises a rotating portion 23 rotatable in relation to the first shower head 1 and a handle 24 fixed to the rotating portion 23; the internal end face of the rotating portion 23 is protruding with a protruding base 211, the protruding base 211 is disposed with a contact surface 212 arranged about the rotating axis of the operation element 2 with a various height of arc; the protruding base 211 is an arc plate about the rotating axis of the operation element 2; the first transmission portion 21 comprises the protruding base 211, the contact surface 212 of the protruding base 211 abuts against the second end of the sliding bar 171 so as to connect to the control mechanism when in the first track A1. preferred, the end face of the protruding base comprises two parallel face and respectively connected the first and second end of the contact surface 212 to form a higher plane and a lower plane.

The internal end face of the operation element 2 is further protruding with a driving base 221; the second transmission portion 22 comprises the driving base 221. An one-way intermittent moving mechanism and a swing bar 26 swinging connected to the first shower head 1 are disposed between the rotation plate 191 and the driving base 221; the driving base 221 is connected to the swing bar 26 in transmission way to drive the swing bar 26 to swing in the second track A2; the swing bar 26 drives the rotating plate 191 to rotate through the one-way intermittent moving mechanism. The one-way intermittent moving mechanism is a ratchet and pawl mechanism 25, which comprises a ratchet 251, a pawl 255 and a reverse-limiting pawl 253; the ratchet 1251 is fixed to the rotating plate 191 by the fixing axis 254 coaxially; the central portion of the pawl 252 is rotatably connected to the first shower head 1; the end of the pawl 252 abuts against the ratchet 251; the swing bar 26 abuts against the pawl 252, making the swing bar 26, when swinging, abuts against the pawl 252 to make the pawl 252 bend and transform; thereby the pawl 252 abuts against the ratchet 251 to push the ratchet 251 to rotate in a first direction; one end of the reverse-limiting pawl 252 is rotatably connected to the first shower head 1, the other end abuts against the ratchet 251 to restrict the ratchet 251 from rotating in a second direction (opposite to the first direction).

Figure 6:
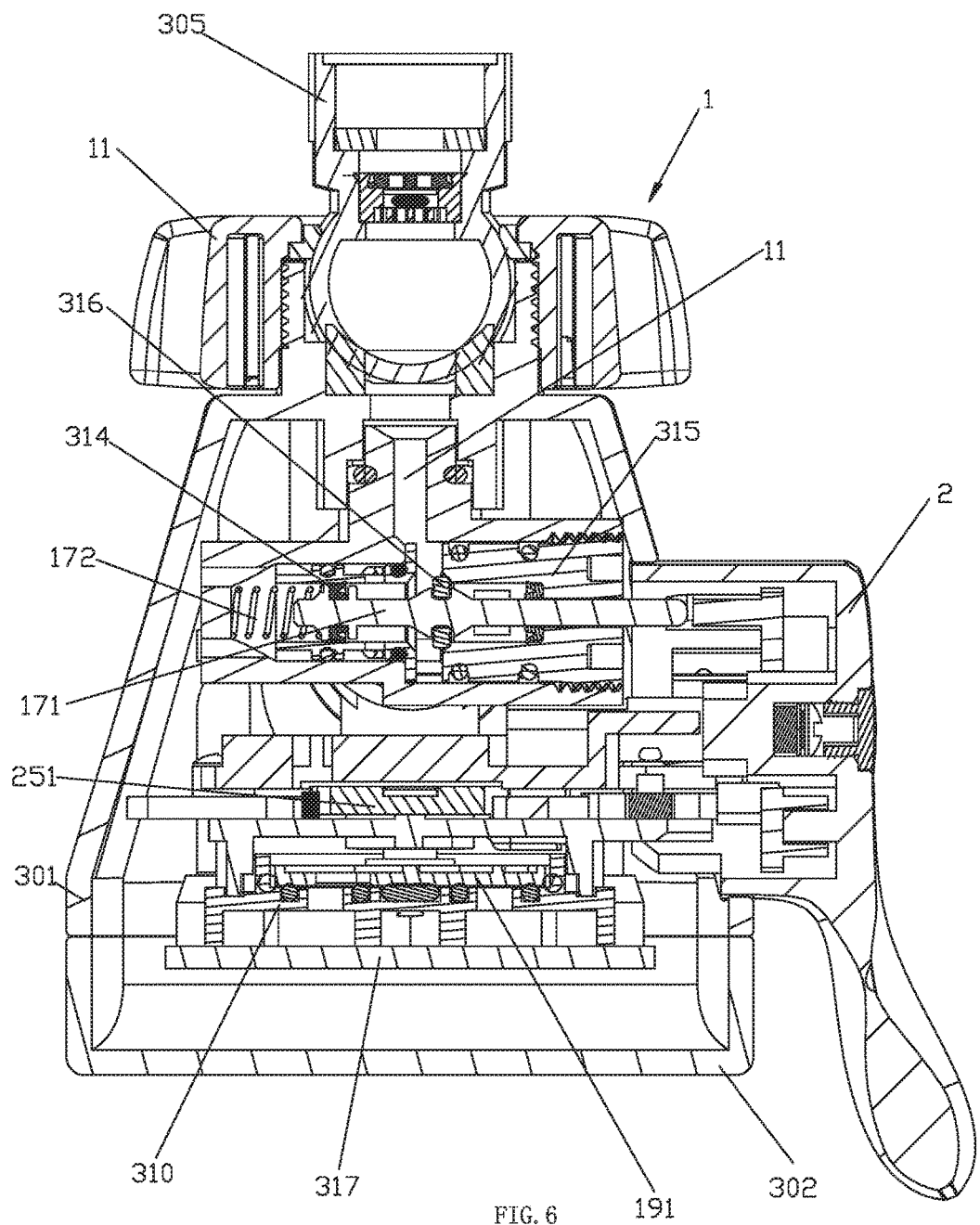
FIG. 6 illustrates a first sectional diagram of the first shower head of the first embodiment when the first shower head discharges cool water out.

In the initial state: as figured in FIG. 6, the operation element 2 is in the initial position, the sliding bar 171 of the control mechanism is in the right position under the action of the first elastic body 172, the inlet passage 11 is connected to the cool water discharging passage 15 and is disconnected to the water supply passage 14, at this time, cool water is in the inlet passage 11, cool water flows through the inlet passage 11, the cool water discharging passage 15, the outlet passage 183 and then flows out of the second shower head to achieve cool water discharging effect. When hot water flows in from the inlet passage 11, namely the cool water is discharged out, the temperature sensing component 16 senses hot water and closes the cool water discharging passage 15.

Figure 7:
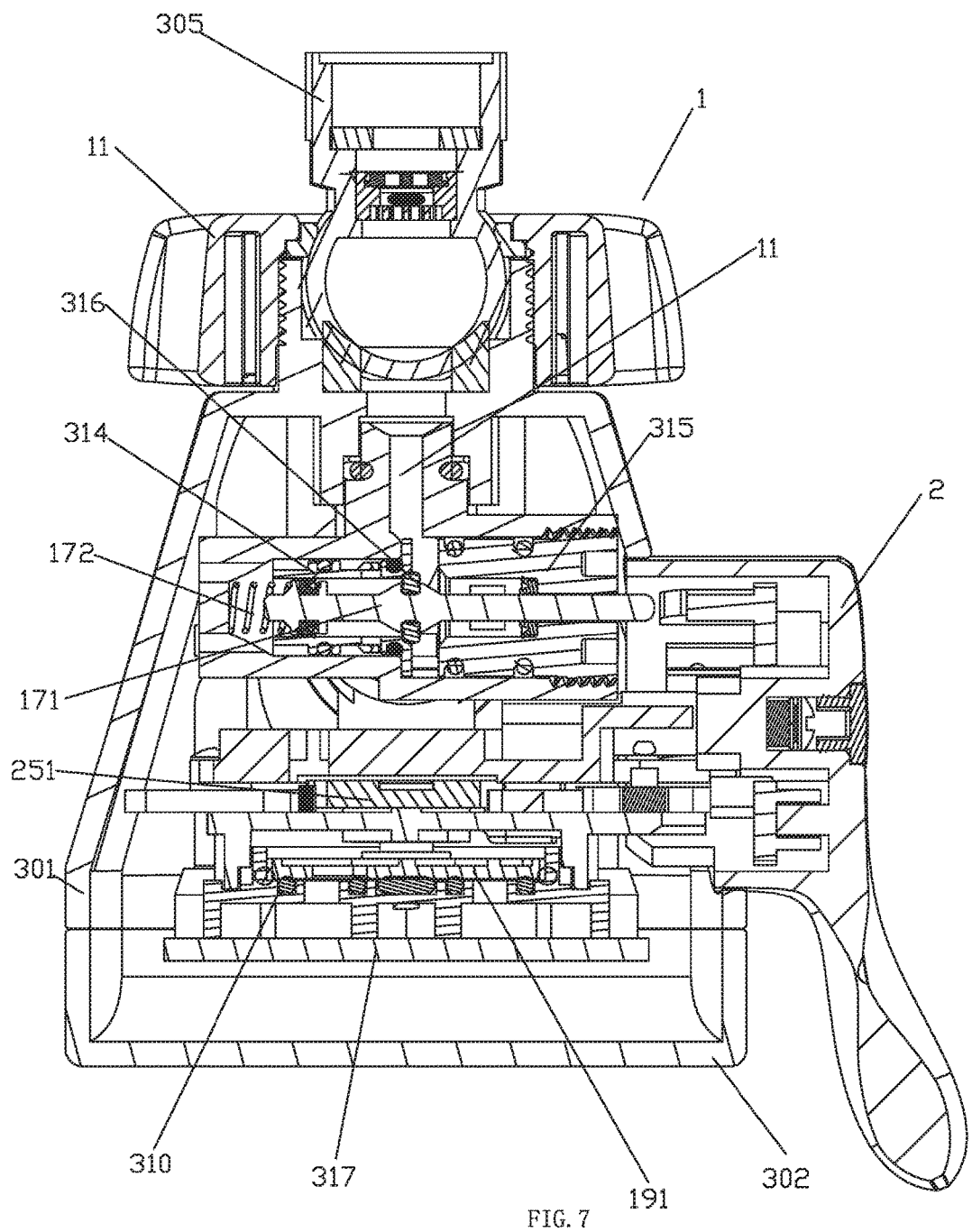
FIG. 7 illustrates a first sectional diagram of the first shower head of the first embodiment when the water supply passage is connected to the inlet passage.
Figure 8:
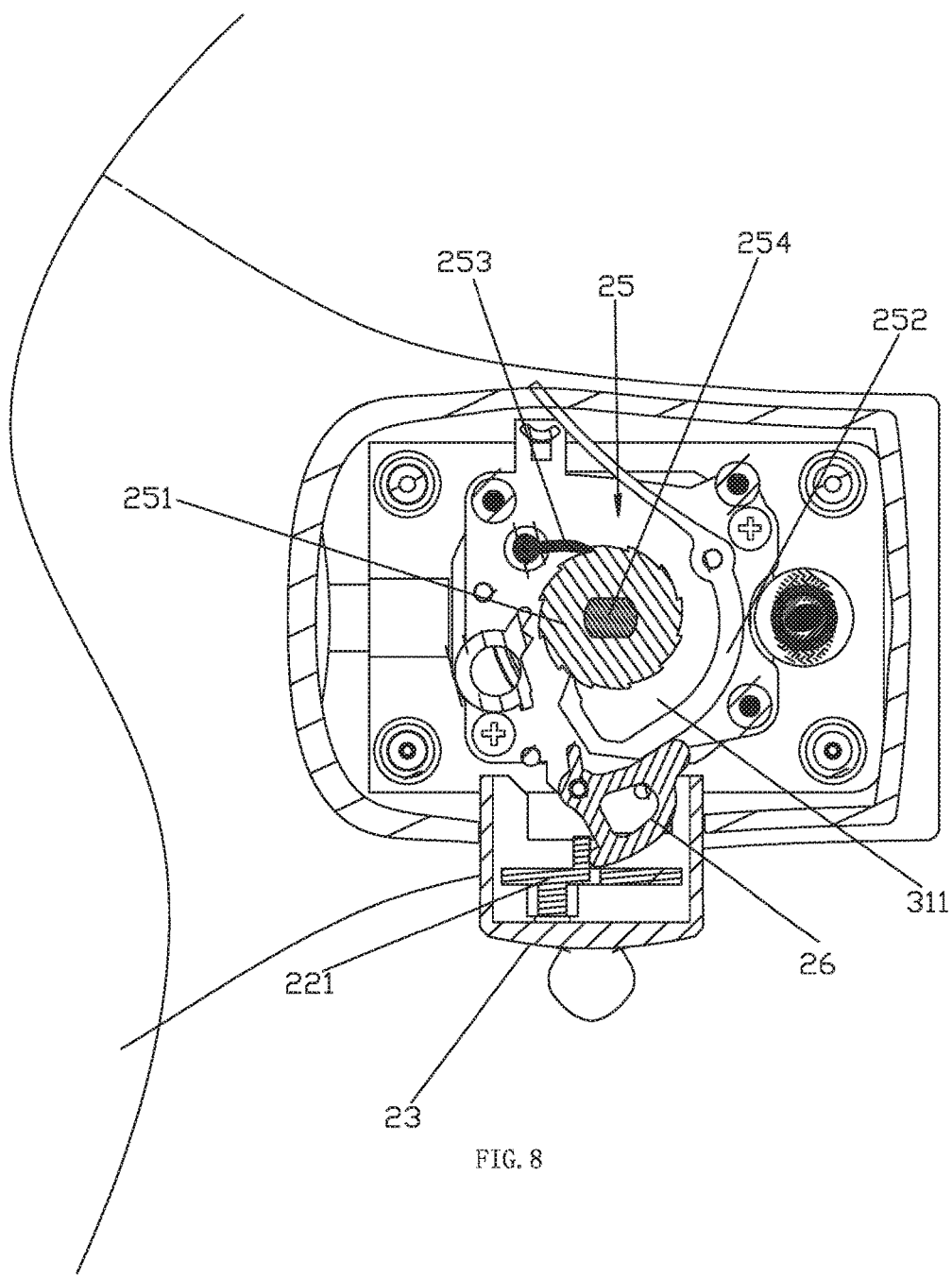
FIG. 8 illustrates a sectional diagram of the first shower head of the first embodiment to figure out the coupling of the operation element, the moving element and the ratchet and pawl mechanism.
Figures 12, 13:
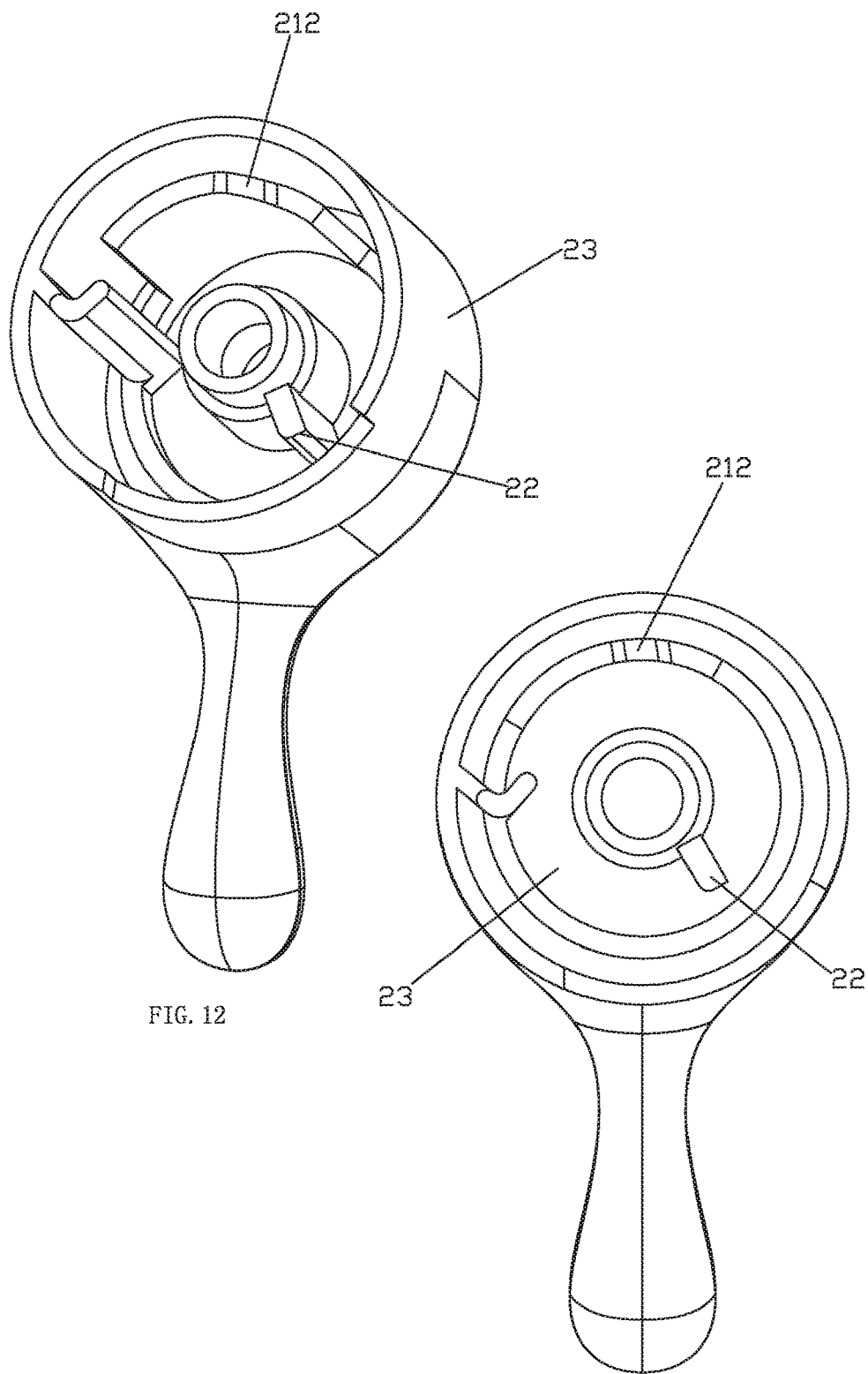
FIG. 12 illustrates a schematic diagram of the operation element of the second embodiment.
FIG. 13 illustrates a front view of the operation element of the second embodiment.
Figure 17:
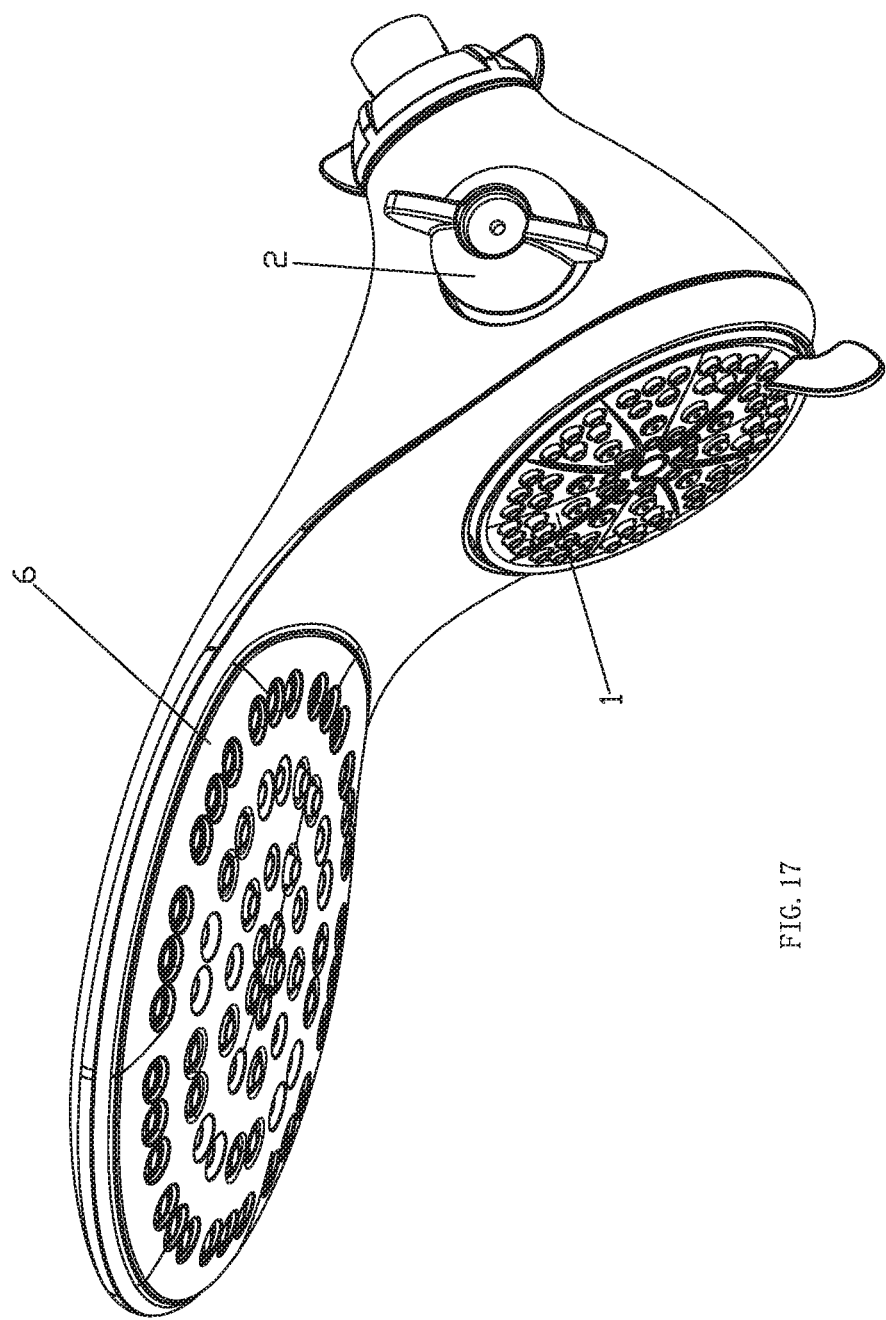
FIG. 17 illustrates a schematic diagram of the combined shower head of the third embodiment.
Figure 18:
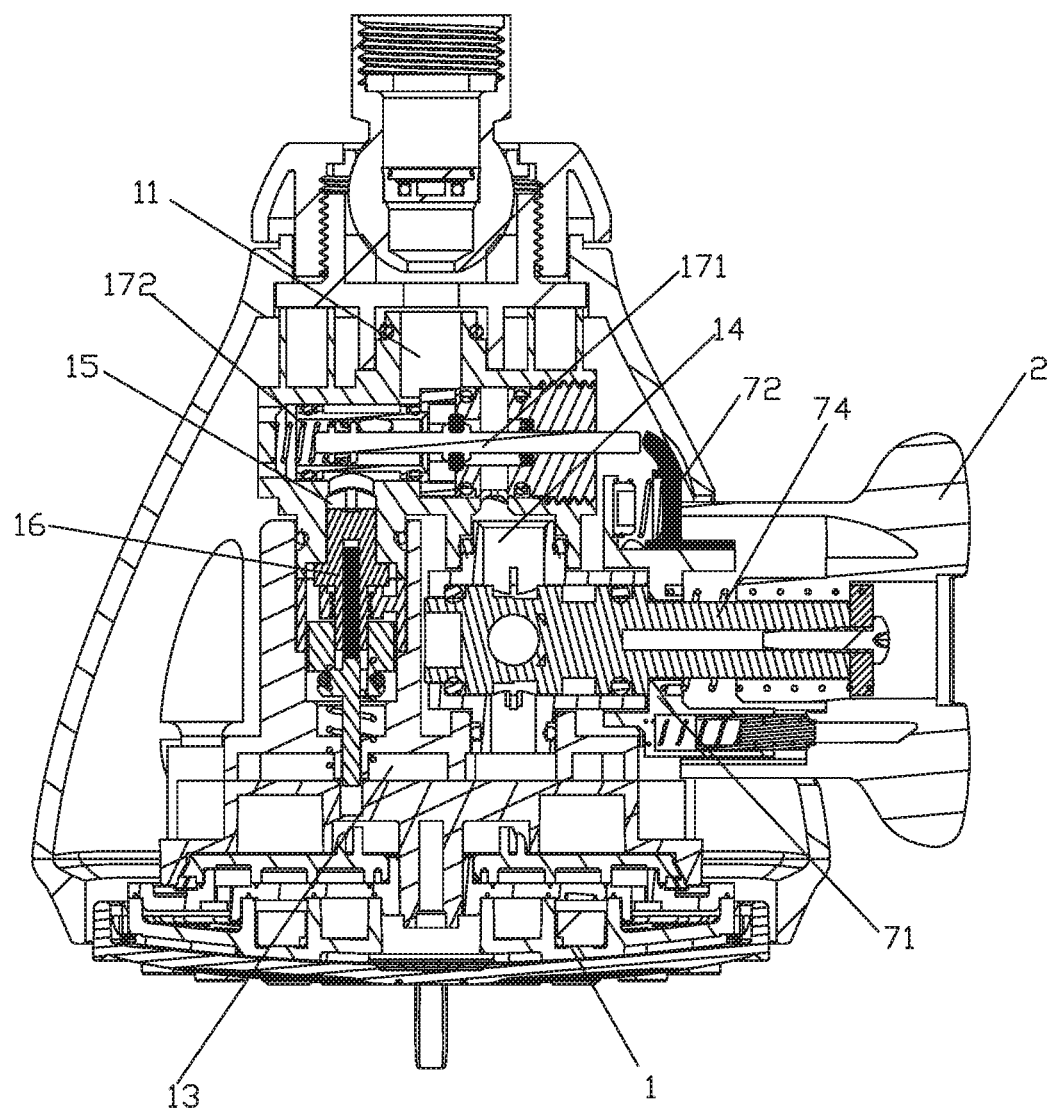
FIG. 18 illustrates a sectional diagram of the combined shower head of the third embodiment when the operation element is in the initial position.
Figure 19:
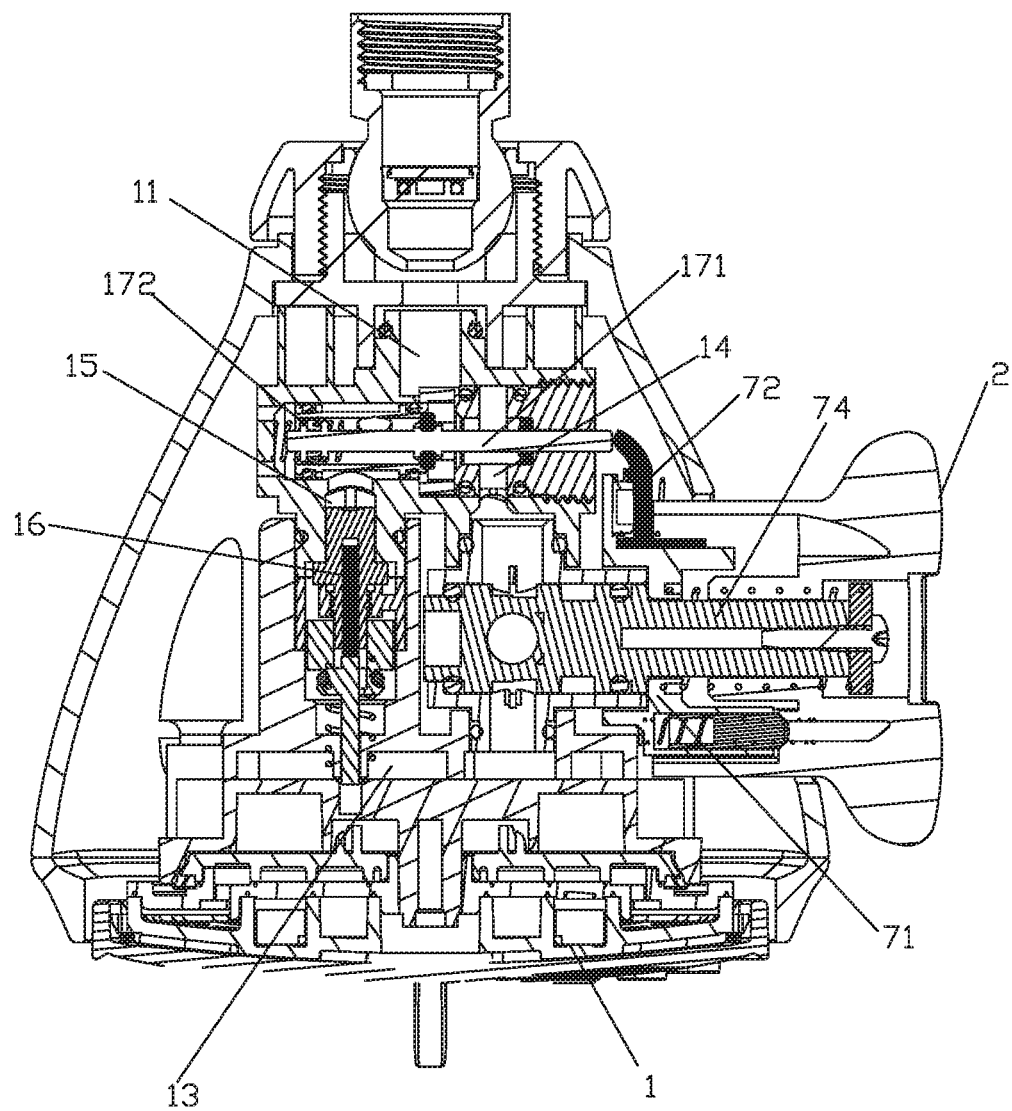
FIG. 19 illustrates a sectional diagram of the combined shower head of the third embodiment when the operation element is in the switch position.
Figure 20:
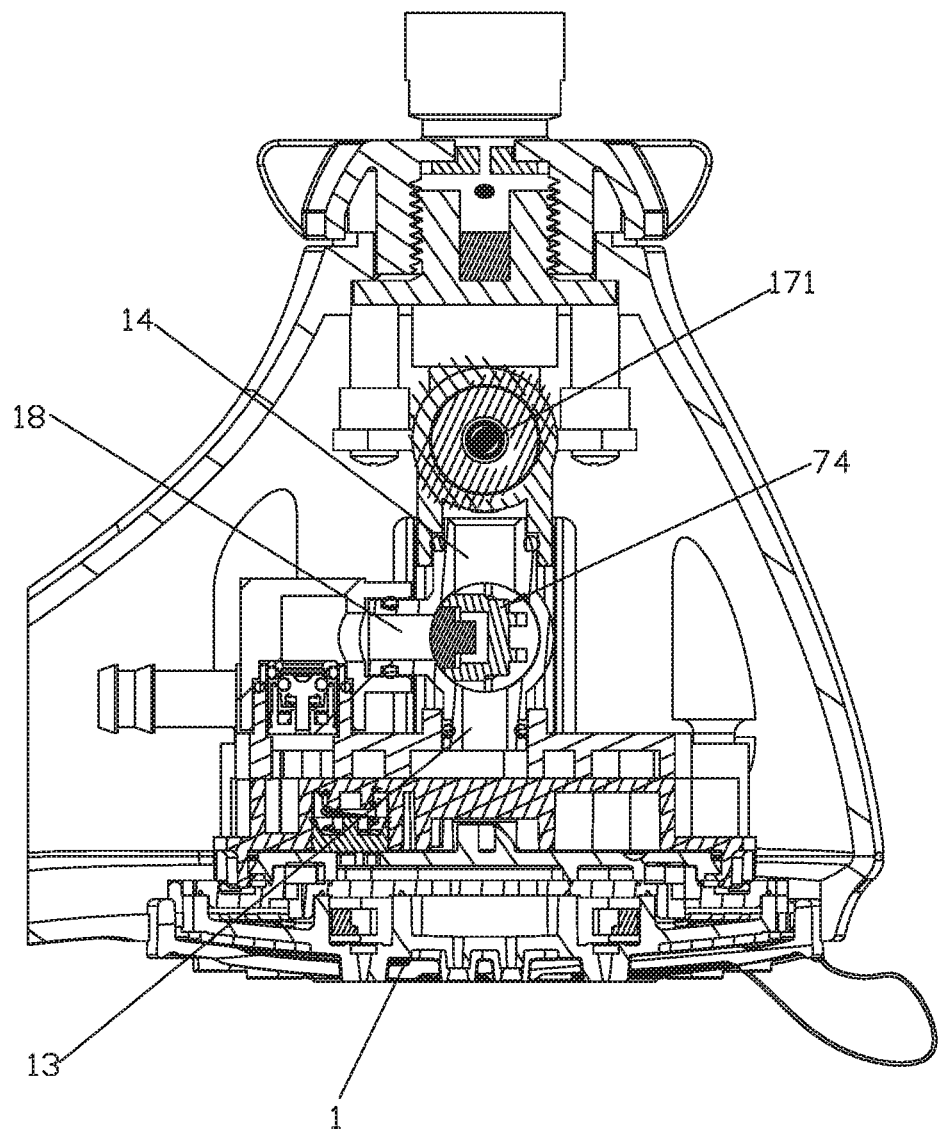
FIG. 20 illustrates a sectional diagram of the combined shower head of the third embodiment when water flows out of the first shower head of the combined shower head.
Figure 21:
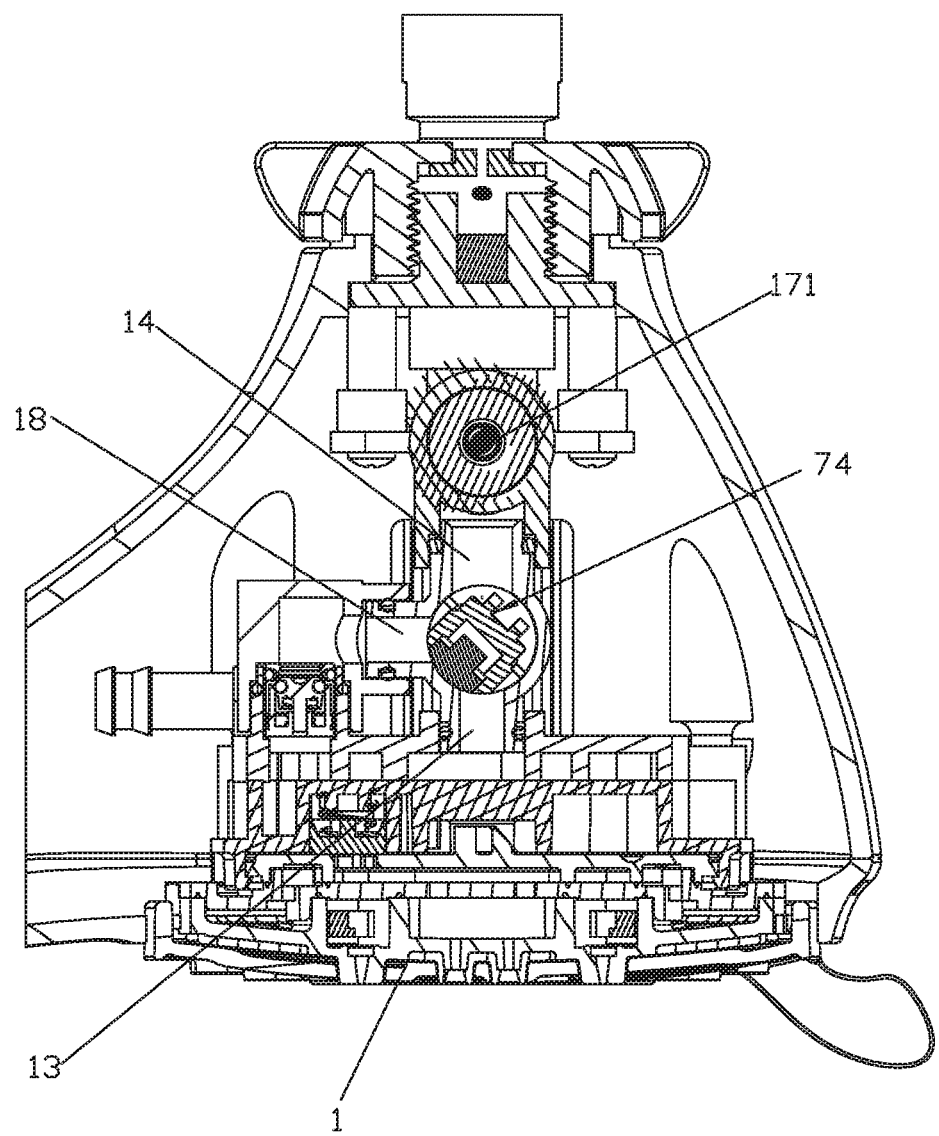
FIG. 21 illustrates a sectional diagram of the combined shower head of the third embodiment when water flows out of the first and second shower head of the combined shower head.
Figure 22:
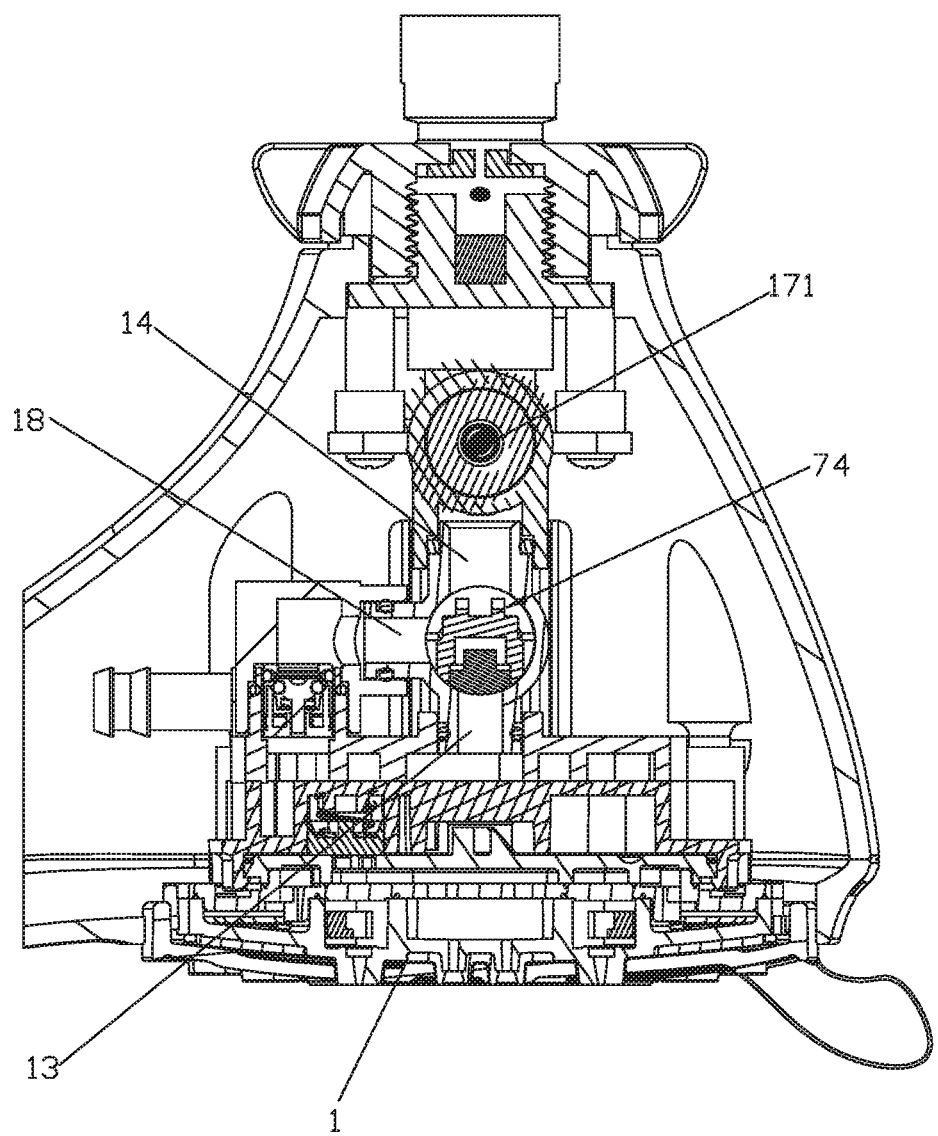
FIG. 22 illustrates a sectional diagram of the combined shower head of the third embodiment when water flows out of the second shower head of the combined shower head.

As figured in FIG. 7, when operating the operation element 2 to move in the first track A1, the contact surface 212 abuts against the sliding bar 171 to push the sliding bar 171 to move left, the inlet passage 11 is connected to the water supply passage 14 and is disconnected to the cool water discharging passage 15; when the operation element 2 is released, the operation element 2 resets to the initial position. When operating the operation element 2 to move in the second track A2, the driving base 221 abuts against the pawl 252 to make the pawl 252 bended and deformed, the ratchet 215 rotates in a preset angle and drives the rotating plate 191 to rotate in the preset angle to achieve switching; after the operation element 2 is released, the operation element 2 resets to the initial position. When the water resource is turned off, water pressure disappears, the sliding bar resets under the action of the first elastic body, the inlet passage is connected to the cool water discharging passage.

In detail, the first shower head 1 comprises an upper main body 301 and a lower main body 302, which are fixedly connected.

The lower main body 302 is disposed with a plurality of through holes running through the body up and down; the first outlet portion 12 is disposed between the lower main body and the upper main body and is fixed to the rear side of the lower main body; the first outlet portion 12 comprises an outlet cover 303 and a cover plate 304; the outlet cover 303 is fixedly connected to the cover plate 304 to form an outlet chamber connected to the first water diversion passage 13; the outlet cover 303 is disposed with outlet nozzles, the outlet nozzles pass through the through holes correspondingly.

The upper main body 301 is universally connected to the water supply pipe by a ball joint 305 and a nut 306 such to install the first shower head 1 to the water supply pipe and thereby guiding the water of the water supply pipe to the inlet passage 11 of the first shower head.

The upper main body 301 is disposed with a throughout hole running through the body up and down; a tee joint 307 is fixed in the upper main body 301 between the upper and lower main body; a first opening of the tee joint 307 is fixed to the upper main body 301 and is connected to the throughout hole; the first opening is coupled to the throughout hole to form the inlet passage 11 or a portion of the inlet passage 11. A plug base 308 is fixed between the upper and lower main body, the internal end of the plug base 308 is connected to the second opening of the tee joint 307, the internal passage forming the cool water discharging passage 15 or a portion of the internal passage forms the cool water discharging passage 15. The external end of the plug base 308 is fixedly connected with a plug 309, which is connected to the external end of the plug base 308; the plug 309 and the plug base 308 are coupled to form above mentioned cool water discharging passage 15 and the outlet passage 183; the external end of the plug 309 forms the external end of the outlet passage 183 to assemble and connect to the second shower head; the plug base 308 further forms with a portion of the connecting passage 182, the check valve 181 is assembled in the plug base 308. The temperature sensing component 16 is assembled in the plug base 308.

A fixing base 317 and a water diversion plate 310 are fixedly assembled between the upper main body 301 and the lower main body 302; the fixing base 317 is fixed to the rear side of the lower main body; the water diversion plate 310 is fixed on the fixing base 317. The fixing base 317 and the water diversion plate 310 are coupled to form a first diversion waterway and a second diversion waterway; a first water diversion hole for the first diversion waterway and a second water diversion hole for the second diversion waterway are disposed on the water diversion plate 310; the first diversion waterway is connected to the outlet chamber to connect to the first outlet portion 12; the first water diversion passage comprises the first diversion waterway. The second diversion waterway is connected to the plug base to form the connecting passage 182. The rotating plate is coupled to the water diversion plate, the rotating plate is disposed with water holes; the first and second water diversion hole are switched to connect to the water hole by the rotating of the rotating plate in relation to the water diversion plate.

An assembly base 311 is fixedly disposed on the water diversion plate 310; the assembly base 311 is fixedly connected to the water diversion plate 310 to form a water diversion chamber; the rotating plate is in the water diversion chamber, the water diversion chamber forms a portion of the water supply passage; one end of the fixing shaft 254 is assembled to the rotating plate, the other end can extend out of the assembly base 311 in sealing and rotating way; a fourth elastic body 312, a spring for example, is disposed between the fixing shaft 254 and the rotating plate to make the rotating plate contacted on the top surface of the water diversion plate, thereby the fixing shaft 254 and the rotating plate rotate synchronously.

A second cover 313 is fixedly disposed on the assembly base 311; the second cover 313 and the assembly base 311 form an assembly space therebetween; above mentioned ratchet and pawl mechanism 25 is assembled in the assembly space. The tee joint 307 is fixed with a left spacer sleeve 314 and a right spacer sleeve 315; the left spacer sleeve 314 is connected to the second opening of the tee joint; the right spacer sleeve 315 is connected to the third opening of the tee joint; the third opening is connected to the water supply passage. The sliding bar 171 is slidably connected to the left and right spacer sleeve; the central portion of the sliding bar 171 is protruding with a protruding ring, a sealing pad 316 is disposed thereon; the protruding ring is disposed at the gap between the left spacer sleeve 314 and the right spacer sleeve 315; the sealing pad 316 closes the right end of the left spacer sleeve 314 to connect the inlet passage and the right spacer sleeve 315 and connect the inlet passage and the water supply passage, or the sealing pad 316 closes the left end of the right spacer sleeve 315 to connect the inlet passage and the left spacer sleeve 314 and connect the inlet passage and the cool water discharging passage by the sliding of the sliding bar. A Y shaped sealing ring is disposed between sliding bar and the left spacer sleeve 314 and the right spacer sleeve 315.

The Second Embodiment

Referring to FIGS. 12-16, this embodiment differs from the first embodiment in that: the first track is a swing track of the operation element 2 in relation to the first shower head 1 from the initial position to the central position, the second track is a swing track of the operation element 2 in relation to the first shower head 1 form the initial position to the switch position. The initial position, the central position and the switch position are arranged in a circumference as figured in FIGS. 14-16. In this embodiment, a central angle is configured between the protruding base 211 and the driving base 221 to set a preset null track therebetween, namely producing a linkage time difference to make the contact surface 212 act on the sliding bar 171, so that when the contact surface 212 drives the sliding bar 171 to move, the driving base 221 has not contacted with the swing bar 26; when the driving base 221 contacts with the swing bar 26, the operation element rotates to drive the swing bar to swing so as to drive the switch mechanism to switch; the higher plane of the contact surface of the protruding base 212 abuts against the sliding bar so as to achieve two-end-dialing operation.

The Third Embodiment

Referring to FIGS. 17-25, this embodiment differs from the first embodiment in that: the first shower head 1 is assembled in the water supply pipe, a top shower head for example, the second shower head is a fixing shower head 6 fixedly assembled to the first shower head 1, a rain-like shower head for example. The operation element 2 is slidable in relation to the first shower head 1 and is rotatably connected to the first shower head 1 about the sliding direction; the sliding of the operation element 2 along the first shower head 1 is the first track; the rotating of the operation element 2 about the first shower head 1 is the second track.

The control mechanism comprises a sliding bar 171 slidable in relation to the first shower head 1 and a first elastic body 172 abutting between the first end of the sliding bar 171 and the first shower head 1; the operation element 1 abuts against the second end of the sliding bar 171 to push the operation element 1 to slide along the axis to control the sliding bar 171 to slide. In detail, the first shower head 1 is disposed with an opening, a pressure cover 71 is fixed to the opening, the operating element 1 is slidably and rotatably connected to the pressure cover 71; a sliding block 72 is slidably connected to the pressure cover 71; the sliding block 72 and the pressure cover 71 are connected by dovetail groove to guarantee the direction of the sliding. The end of the sliding block 72 extends backwardly to form a suspending abutting portion 73; the operation element 1 abuts against the sliding block 72 to drive the sliding block 72 to slide to the inside, the suspending abutting portion 73 abuts against the second end of the sliding bar, so that the sliding block slides to drive the sliding bar to slide to the inside.

The switch mechanism comprises a rotating base 74 rotatably connected to the first shower head 1, the rotating base 74 rotates in relation to the first shower head 1 to achieve switch. The operation element is connected to the rotating base 74 in transmission way to make the operation element 1 rotate to control the rotating base to rotate to switch. In detail, the operation element and the rotating plate rotate coaxially synchronously and they are movably connected in the axial direction. A castellated shaft can be used to make the two objects rotate synchronously and move in the axis of the castellated shaft.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A combined shower head with cool water discharging function, comprising a first shower head and a second shower head; the first shower head is disposed with an inlet passage, a first outlet portion and a first water diversion passage connected to the first outlet portion, the second shower head is disposed with a second outlet portion; wherein
the first shower head is further disposed with a water supply passage, a cool water discharging passage connected to the inlet passage, a temperature sensing component disposed in the cool water discharging passage and a control mechanism, the control mechanism is coupled to the inlet passage and the water supply passage to control the connection and disconnection of the inlet passage and the water supply passage;
the first shower head is further disposed with a second water diversion passage and a switch mechanism; the switch mechanism is coupled to the water supply passage, the first water diversion passage and the second water diversion passage to fluid communicate the water supply passage with one of the first and second water diversion passage; the cool water discharging passage is connected to the second water diversion passage, the second water diversion passage is connected to the second outlet portion.

2. The combined shower head with cool water discharging passage according to claim 1, wherein the first shower head is further disposed with a check valve being disposed at the portion of the second water diversion passage connecting the cool water discharging passage and the switch mechanism.

3. The combined shower head with cool water discharging passage according to claim 1, wherein the control mechanism is also a switch mechanism, the switch mechanism is coupled to the inlet passage, the water supply passage and the cool water discharging passage to fluid communicate the inlet passage with one of the water supply passage and the cool water discharging passage.

4. The combined shower head with cool water discharging passage according to claim 1, wherein further comprising an operation portion being assembled in the first shower head and connected the control mechanism and the switch mechanism in transmission way to control the control mechanism and the switch mechanism.

5. The combined shower head with cool water discharging passage according to claim 4, wherein the operation portion comprises an operation element being movably connected to the first shower head and being movable in a first track and a second track in relation to the first shower head; the operation element is disposed with a first transmission portion coupled to the control mechanism and a second transmission portion coupled to the switch mechanism; the operation element moves in the first track and the second track so as to respectively drive the control mechanism by the first transmission portion and drive the switch mechanism by the second transmission portion in transmission way.

6. The combined shower head with cool water discharging function according to claim 5, wherein the operation portion is rotatably connected to the first shower head; the first track is a swing track of the operation element swinging from an initial position to a forward position in relation to the first shower head; the second track is a swing track of the operation element swinging from an initial position to a backward position in relation to the first shower head; the forward position and the backward position are arranged at two sides of the initial position.

7. The combined shower head with cool water discharging function according to claim 6, wherein the end face of the operation element is protruding with a protruding base, the protruding base is disposed with a contact surface arranged about the rotating axis of the operation element with a various height of arc; the first transmission portion comprises the protruding base, the contact surface of the protruding base is connected to the control mechanism in transmission way; the end face of the operation element is protruding with a driving base, the second transmission portion comprises the driving base.

8. The combined shower head with cool water discharging function according to claim 7, wherein the control mechanism comprises a slide bar slidable in relation to the first shower head and a first elastic body abutting between a first end of the slide bar and the first shower head; the contact surface abuts against the second end of the slide bar; the slide bar resets and the inlet passage is connected to the cool water discharging passage after the water supply is turned off under the action of the first elastic body.

9. The combined shower head with cool water discharging function according to claim 7, wherein the switch mechanism comprises a rotating plate rotatably connected to the first shower head, the rotating plate switches the functions by rotating in relation to the first shower; an one-way intermittent moving mechanism and a moving element movably connected to the first shower head are disposed between the rotation plate and the driving base; the driving base is connected to the moving element in transmission way to drive the moving element to move in the second track; the moving element drives the rotating plate to rotate through the one-way intermittent moving mechanism.

10. The combined shower head with cool water discharging function according to claim 9, wherein the one-way intermittent moving mechanism is a ratchet and pawl mechanism, the ratchet of the ratchet and pawl mechanism is fixed to the rotating plate coaxially; the moving element is connected to the pawl of the ratchet and pawl mechanism in transmission way.

11. The combined shower head with cool water discharging function according to claim 10, wherein the moving element is a swing bar connected to the first shower head in swing way.

12. The combined shower head with cool water discharging function according to claim 6, wherein a second elastic body is disposed between the operation element and the first shower head to drive the operation element to reset to the initial position.

13. The combined shower head with cool water discharging function according to claim 5, wherein the operation portion is rotatably connected to the first shower head; the first track is a swing track of the operation element swinging from an initial position to a central position in relation to the first shower head; the second track is a swing track of the operation portion swinging from an initial position to a switch position in relation to the first shower head; the initial position, the central position and the switch position are arranged in a circumference.

14. The combined shower head with cool water discharging function according to claim 13, wherein the end face of the operation element is protruding with a protruding base, the protruding base is disposed with a contact surface arranged about the rotating axis of the operation element with a various height of arc; the first transmission portion comprises the protruding base, the contact surface of the protruding base is connected to the control mechanism in transmission way; the end face of the operation element is protruding with a driving base, the second transmission portion comprises the driving base.

15. The combined shower head with cool water discharging function according to claim 14, wherein the control mechanism comprises a slide bar slidable in relation to the first shower head and a first elastic body abutting between a first end of the slide bar and the first shower head; the contact surface abuts against the second end of the slide bar; the slide bar resets and the inlet passage is connected to the cool water discharging passage after the water supply is turned off under the action of the first elastic body.

16. The combined shower head with cool water discharging function according to claim 14, wherein the switch mechanism comprises a rotating plate rotatably connected to the first shower head, the rotating plate switches the functions by rotating in relation to the first shower; an one-way intermittent moving mechanism and a moving element movably connected to the first shower head are disposed between the rotation plate and the driving base; the driving base is connected to the moving element in transmission way to drive the moving element to move in the second track; the moving element drives the rotating plate to rotate through the one-way intermittent moving mechanism.

17. The combined shower head with cool water discharging function according to claim 16, wherein the one-way intermittent moving mechanism is a ratchet and pawl mechanism, the ratchet of the ratchet and pawl mechanism is fixed to the rotating plate coaxially; the moving element is connected to the pawl of the ratchet and pawl mechanism in transmission way.

18. The combined shower head with cool water discharging function according to claim 17, wherein the moving element is a swing bar connected to the first shower head in swing way.

19. The combined shower head with cool water discharging function according to claim 13, wherein a second elastic body is disposed between the operation element and the first shower head to drive the operation element to reset to the initial position.

20. The combined shower head with cool water discharging function according to claim 5, wherein the operation element is slidable in relation to the first shower head and is rotatably connected to the first shower head about the sliding direction, the sliding track of the operation element along the first shower head is the first track, the rotating track of the operation element about the first shower head is the second track.

21. The combined shower head with cool water discharging function according to claim 20, wherein:
   the control mechanism comprises a sliding bar slidable in relation to the first shower head and a first elastic body abutting between a first end of the sliding bar and the first shower head; the operation element abuts against a second end of the sliding bar to control the sliding bar to slide;
   the switch mechanism comprises a rotating base rotatably connected to the first shower head, the rotating plate rotates in relation to the first shower head to switch; the operation element is connected to the rotating base in transmission way to control the rotating base to rotate.

22. The combined shower head with cool water discharging function according to claim 21, wherein the operation element and the rotating plate rotate coaxially and synchronously and are movably connected in the axial direction.

23. The combined shower head with cool water discharging function according to claim 5, wherein the operation element is rotatably connected to the first shower head, the rotating of the operation element along the first shower head is the first rack; the reversely rotating of the operation element along the first shower head is the second track; a clutch is disposed between the operation element, the control mechanism and the switch mechanism.

24. The combined shower head with cool water discharging function according to claim 4, wherein the operation portion comprises a first operation element movably connected to the first shower head and a second operation element movably connected to the first shower head; the first operation element is connected to the control mechanism in transmission way, the second operation element is connected to the switch mechanism in transmission way.

* * * * *